US012683892B2

(12) United States Patent
Llamas Virgen et al.

(10) Patent No.: US 12,683,892 B2
(45) Date of Patent: Jul. 14, 2026

(54) DYNAMIC MEDIA ROUTER

(71) Applicant: INTERNATIONAL BUSINESS MACHINES CORPORATION, Armonk, NY (US)

(72) Inventors: Paul Llamas Virgen, Guadalajara (MX); Priyansh Jaiswal, Boca Raton, FL (US); Peeyush Jaiswal, Boca Raton, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/185,770

(22) Filed: Mar. 17, 2023

(65) Prior Publication Data

US 2024/0314062 A1     Sep. 19, 2024

(51) Int. Cl.
H04L 45/00          (2022.01)
H04L 43/0823      (2022.01)
(Continued)

(52) U.S. Cl.
CPC .......... H04L 45/22 (2013.01); H04L 43/0847 (2013.01); H04L 45/70 (2013.01); H04L 65/403 (2013.01)

(58) Field of Classification Search
CPC ......... H04L 45/22; H04L 45/70; H04L 65/80; H04L 65/403; H04L 65/752
(Continued)

(56) References Cited

U.S. PATENT DOCUMENTS 5,617,539 A     4/1997   Ludwig
6,154,463 A     11/2000  Aggarwal
(Continued)

FOREIGN PATENT DOCUMENTS

CN     109688366 A     12/2020
CN     112738446 A     4/2021

OTHER PUBLICATIONS

Grandview Research, "Global Virtual Events Market Size & Share Report, 2030", https://www.grandviewresearch.com/industry-analysis/virtual-events-market, accessed Nov. 18, 2022, pp. 1-9.
(Continued)

*Primary Examiner* — John Pezzlo
(74) *Attorney, Agent, or Firm* — Kristofer Haggerty

(57)          ABSTRACT
A method, a structure, and a computer system for dynamic media routing. The exemplary embodiments may include determining a quality of one or more existing network connections corresponding to one or more participants of a virtual conference and transmitting a media stream sample and a corresponding checksum value between the one or more members of the virtual conference using one or more alternative network connections. The exemplary embodiments may further include determining a quality of the one or more alternative network connections based on the media stream sample and the corresponding checksum value, and, based on determining that the quality of the one or more alternative network connections is higher than the quality of the one or more existing network connections, switching the one or more existing network connections to the one or more alternative network connections.

20 Claims, 5 Drawing Sheets

(51) Int. Cl.
  *H04L 65/403*      (2022.01)
  *H04L 65/80*      (2022.01)
(58) Field of Classification Search
  USPC ................................. 370/237, 260, 356, 389
  See application file for complete search history.

(56)          References Cited

U.S. PATENT DOCUMENTS

| | | | | |
|---|---|---|---|---|
| 7,626,994 | B2 | 12/2009 | Bennett | |
| 8,467,376 | B2 | 6/2013 | Kubler | |
| 9,621,853 | B1 | 4/2017 | Yang | |
| 10,157,358 | B1 | 12/2018 | Brisebois | |
| 10,187,433 | B2 | 1/2019 | Maistri | |
| 10,375,565 | B2 | 8/2019 | Vasseur | |
| 10,880,342 | B2 * | 12/2020 | Perreault | ............. H04L 65/1094 |
| 11,044,287 | B1 | 6/2021 | Mahajan | |
| 11,367,445 | B2 | 6/2022 | Dixit | |
| 2019/0141193 | A1 * | 5/2019 | Lee | .......................... H04L 65/80 |

| | | | | |
|---|---|---|---|---|
| 2021/0006606 | A1 * | 1/2021 | Vendrow | ............. H04L 65/1069 |
| 2022/0070229 | A1 | 3/2022 | Devaraj | |
| 2024/0073123 | A1 * | 2/2024 | Penar | ...................... H04L 45/28 |

OTHER PUBLICATIONS

IBM, "IBM Strategic Partnerships",https://www.ibm.com/strategic-partnerships?Ink=fab, accessed Nov. 18, 2022, pp. 1-15.
IBM, "IBM Video Streaming", https://www.ibm.com/products/video-streaming, accessed Nov. 16, 2022, pp. 1-5.
IBM, "IBM Watson Media", https://support.video.ibm.com/hc/, accessed Nov. 18, 2022, pp. 1-4.
IBM, "Streaming Video Blog", https://blog.video.ibm.com/, July 7, 2022, pp. 1-15.
Zhang et al., "Dynamic overlay routing based on active probing measurements: An emulation study," 2009 Asia Communications and Photonics conference and Exhibition (ACP), IEEE, 2009, Downloaded: Sep. 29, 2022, pp. 1-7.

* cited by examiner

Figure 1:
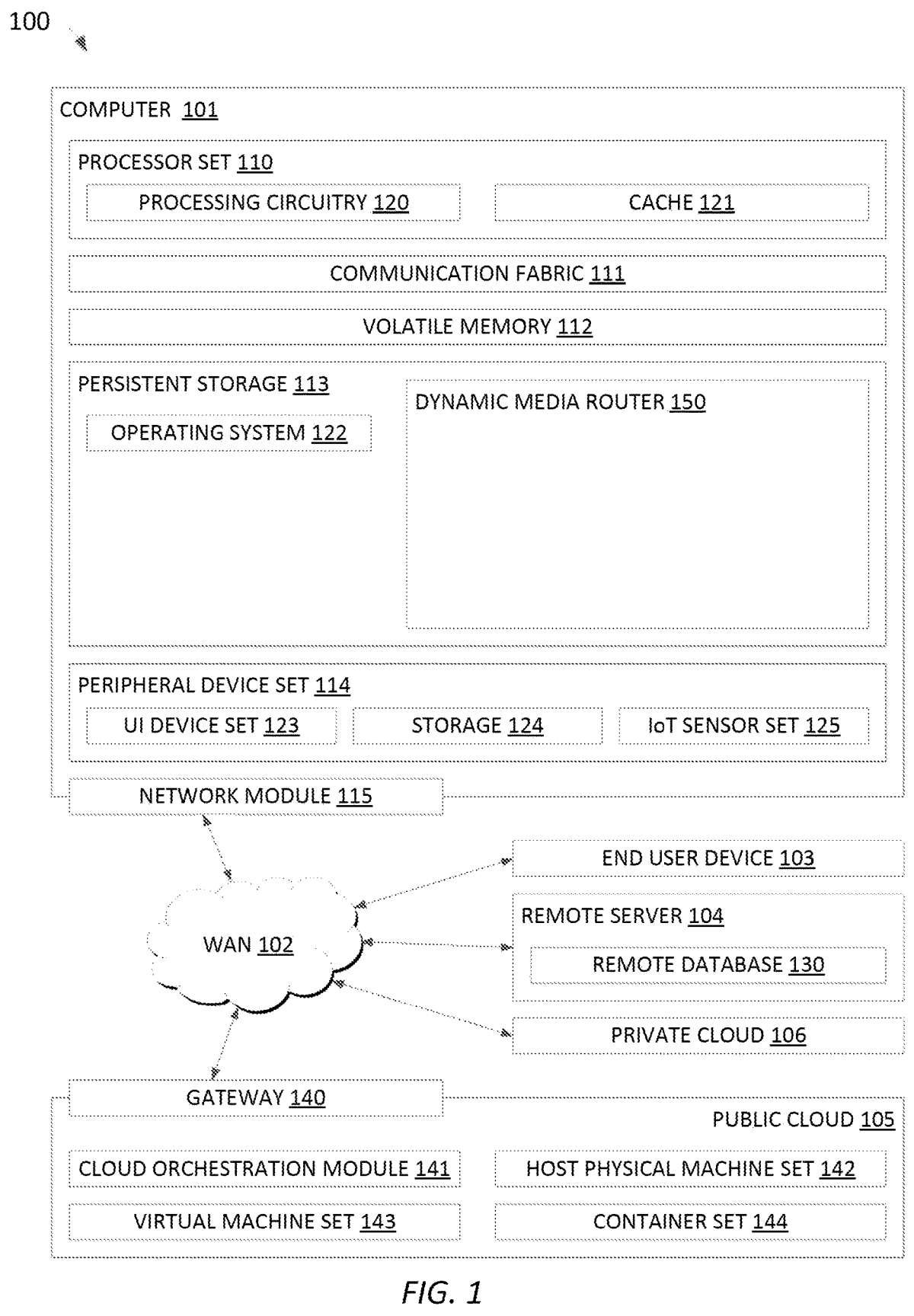

100

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

DYNAMIC MEDIA ROUTER 150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

DYNAMIC MEDIA ROUTER

BACKGROUND

The exemplary embodiments relate generally to network optimization, and more particularly to network optimization via dynamic media routing.

Virtual conferences imitate in-person conferences by transmitting participant media streams over network connections. While virtual conferences held over high quality network connections may act as a suitable replacement for in-person conferences, virtual conferences held over low quality network connections may instead result in participants missing portions of the conference media streams.

SUMMARY

The exemplary embodiments disclose a method, a structure, and a computer system for dynamic media routing. The exemplary embodiments may include determining a quality of one or more existing network connections corresponding to one or more participants of a virtual conference and transmitting a media stream sample and a corresponding checksum value between the one or more members of the virtual conference using one or more alternative network connections. The exemplary embodiments may further include determining a quality of the one or more alternative network connections based on the media stream sample and the corresponding checksum value, and, based on determining that the quality of the one or more alternative network connections is higher than the quality of the one or more existing network connections, switching the one or more existing network connections to the one or more alternative network connections.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which:

FIG. 1 depicts an exemplary block diagram depicting the components of computing environment 100, in accordance with the exemplary embodiments.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION

Figure 2:
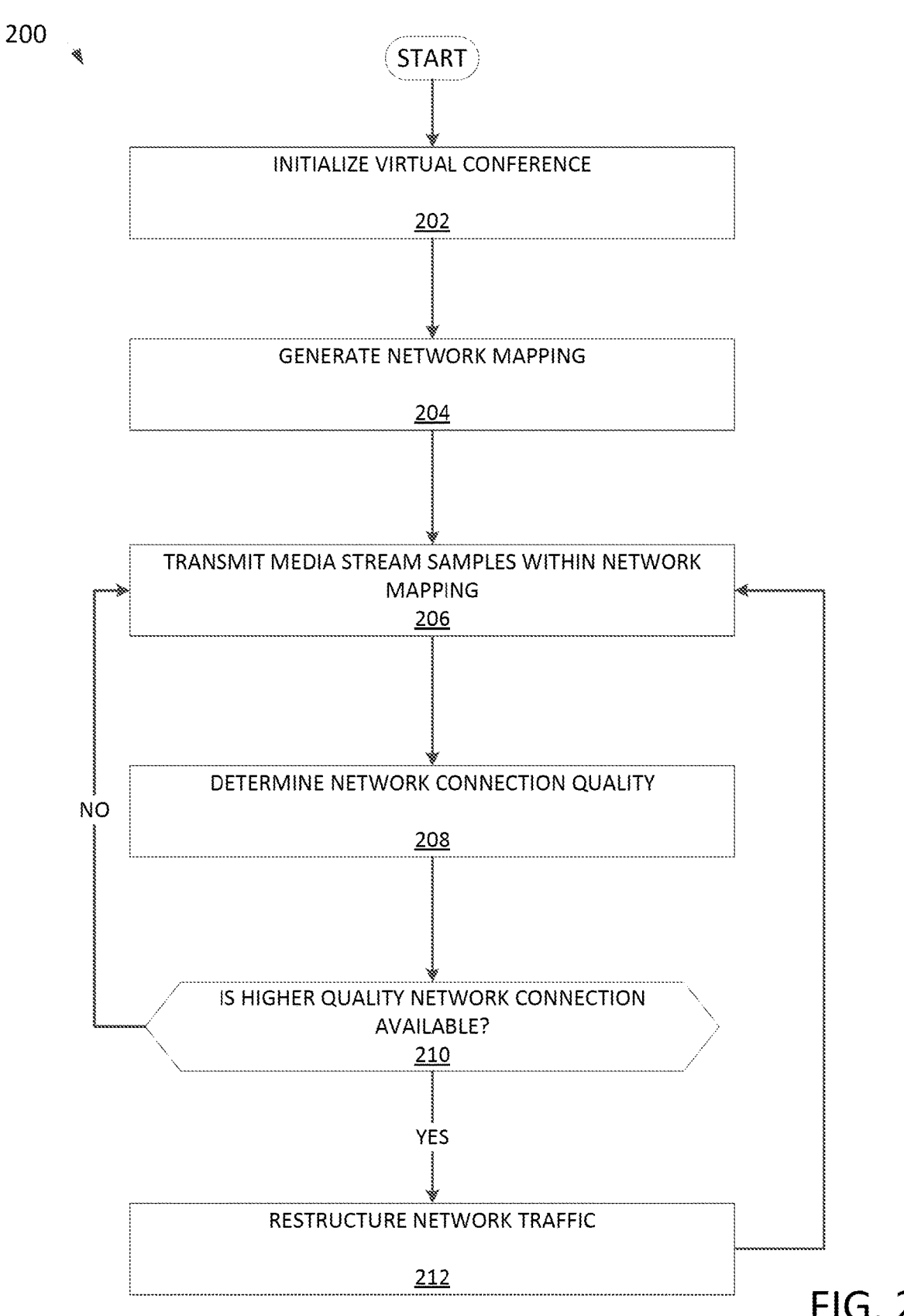
FIG. 2 depicts an exemplary flowchart 200 illustrating operations of dynamic media router 150 of computing environment 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

FIG. 1 depicts an exemplary block diagram depicting the components of computing environment 100, in accordance with the exemplary embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as dynamic media router 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open-source Portable Operating System Interface-type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user, and may take any of the forms discussed above with respect to computer 101. The EUD 103 may further include any components described with respect to computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 depicts an exemplary flowchart 200 illustrating the operations of dynamic media router 150 of computing environment 100, in accordance with the exemplary embodiments.

Virtual conferences imitate in-person conferences by transmitting participant media streams over network connections. While virtual conferences held over high quality network connections may act as a suitable replacement for in-person conferences, virtual conferences held over low quality network connections may instead result in participants missing portions of the conference media streams.

Dynamic media router 150 may improve upon existing virtual conferencing platforms by identifying low quality network connections and circumventing the low quality network connections via rerouting of the conference media. By avoiding low quality network connections, dynamic media router 150 may increase a speed, bandwidth, range, etc. of network connections through which media is transmitted. Dynamic media router 150 may, for example, switch media transmission from a client-server model depicted by FIG. 3A to a client-server and peer-to-peer hybrid model depicted by FIG. 3C, or vice versa. Dynamic media router 150 may further store data detailing conference participants and network connections such that optimized media routing may be initially configured in future conferences having similar conditions.

Dynamic media router 150 may initialize a virtual conference (step 202). In embodiments, dynamic media router 150 may include or be integrated with existing virtual conferencing platforms capable of connecting two or more participants via media streams. Dynamic media router 150 may identify the start of a virtual conference via communication with at least one of the clients, and may initially extract client device identifying information such as logged-in user, internet protocol (IP) address, media access control (MAC) address, etc., via communication with client device operating systems. In addition, dynamic media router 150 may initially and continuously measure a quality of service (QOS) of network connections between the server and the clients under TCP/UDP data transfer protocols. The quality of service may be determined from network packet traffic and quantify metrics such as packet loss, bit rate, throughput, transmission delay, availability, jitter, etc.

Figures 3A, 3B:
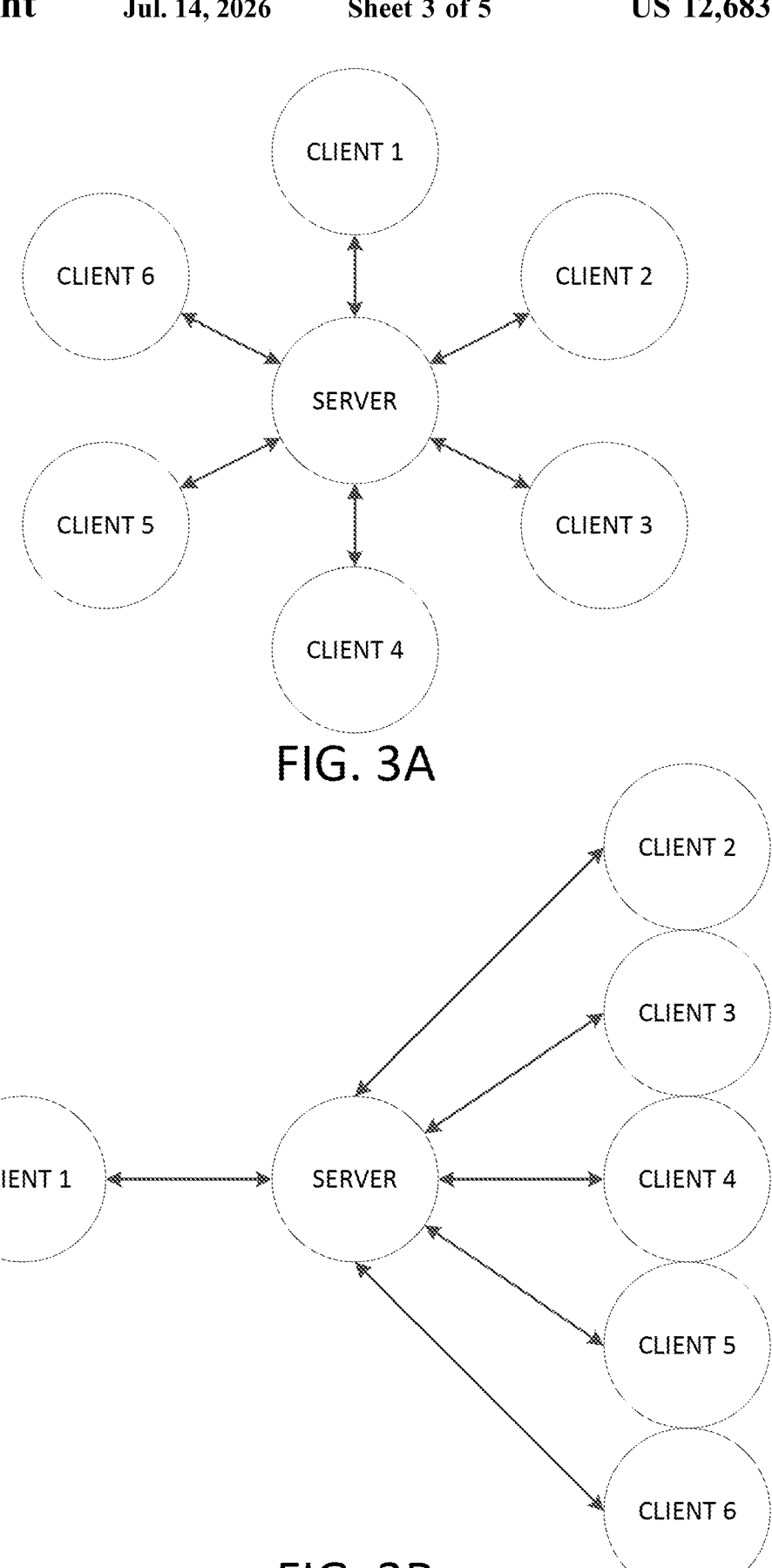
FIG. 3A depicts an exemplary client-server network configuration, in accordance with the exemplary embodiments.
FIG. 3B depicts an exemplary network connection of a client within a client-server network configuration, in accordance with the exemplary embodiments.
Figure 3C:
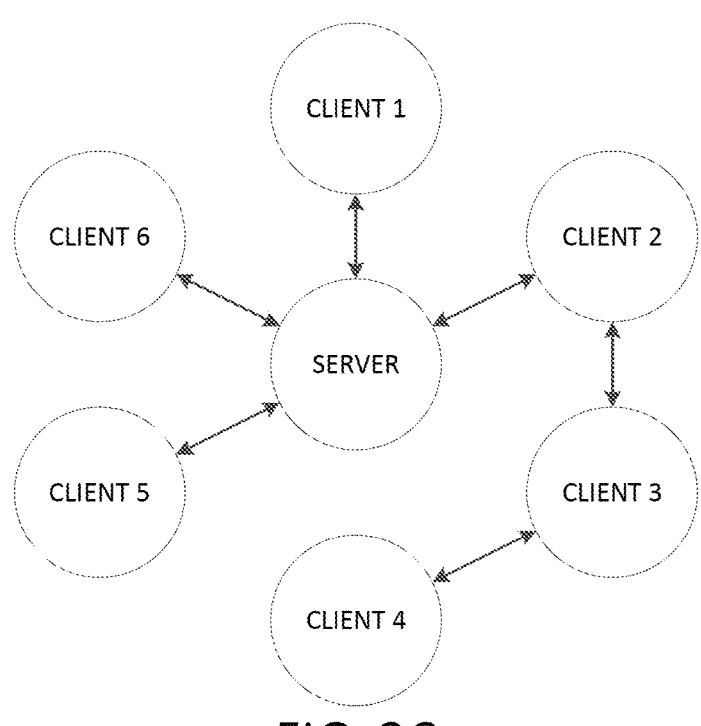
FIG. 3C depicts an exemplary client-server and peer-to-peer hybrid network configuration, in accordance with the exemplary embodiments.
Figure 3D:
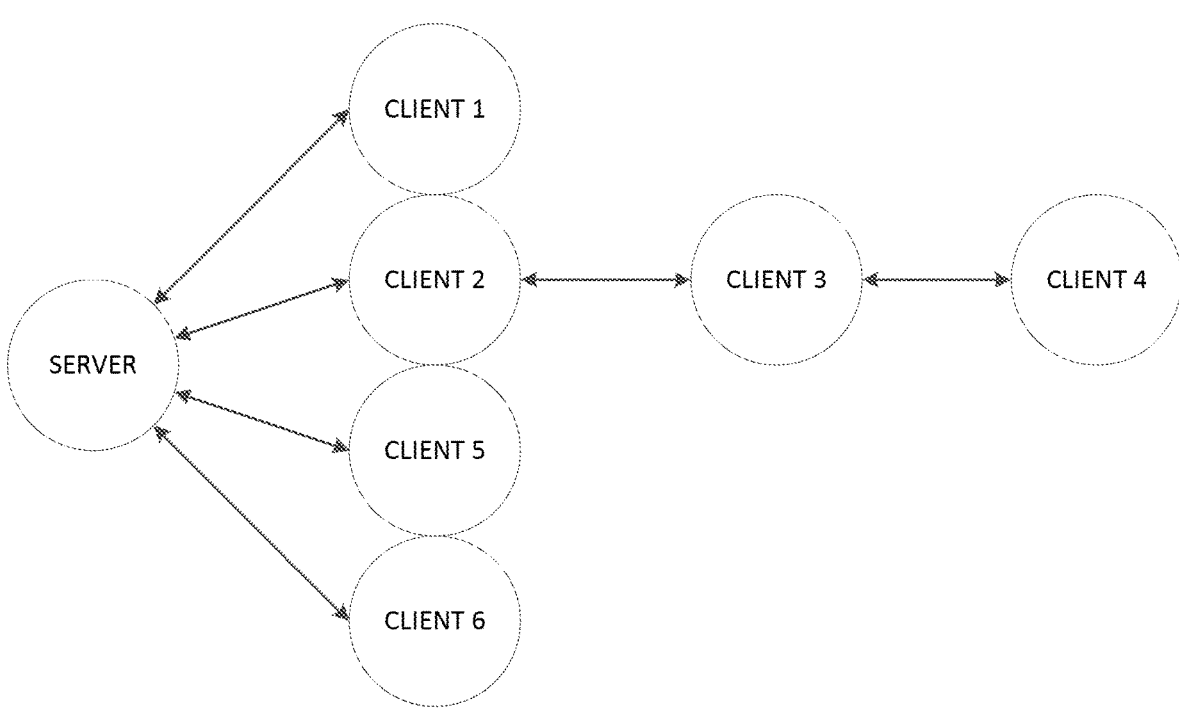
FIG. 3D depicts an exemplary network connection of a client within a client-server and peer-to-peer hybrid network configuration, in accordance with the exemplary embodiments.

Dynamic media router 150 may further determine an initial network configuration of the virtual conference participants, for example client-server or peer-to-peer. By default, conferencing platforms may typically be installed by virtual conference participants on corresponding devices as clients under a client-server model. Like a hub and spoke, in a client-server model each participant client device is connected via a network connection spoke to a central server hub, and conference media is transmitted between participants through the central server (see FIG. 3A depicting client-server network connections and FIG. 3B depicting a network connection path for a given client). By contrast, a peer-to-peer network configuration allows for network connections and traffic between participants (see clients 3-4 of FIG. 3C depicting a hybrid of client-server and peer-to-peer network configurations and FIG. 3D depicting a network connection path for a given client). It should be noted however that the present invention may be equally applicable to the routing of media within client-server, peer-to-peer, and hybrid models.

In embodiments, dynamic media router 150 may determine the network configuration of the participants based on the extracted quality of service metrics, namely the source, destination, and intermediary stops of network packets. More specifically, dynamic media router 150 may determine the network configuration by determining whether network packets are received from a same or different client devices. If network packets are received from different source client devices, dynamic media router 150 determines that each participant is connected directly to the server in a client-server configuration (see FIG. 3A). Alternatively, if dynamic media router 150 determines that network packets originating from multiple sources are received from a same client device, dynamic media router 150 determines that the multiple participants are implementing a peer-to-peer or hybrid network configuration. See, for example, FIG. 3C where client 2 may transmit data for both of clients 3 and 4 in a peer-to-peer network configuration. Thus, while network packets may originate at clients 3 or 4, dynamic media router 150 receives them from client 2 and identifies the peer-to-peer network connections.

Dynamic media router 150 may store the collected data in profiles in association with the participants. The profiles may detail the participants, e.g., username, as well as network connection information such as one or more user devices, one or more user locations, one or more networks corresponding to the one or more locations, a historic quality of the one or more networks, etc. By storing participant data in associated profiles, dynamic media router 150 may reference historic network mappings for expedited analysis based on past performance under similar circumstances, as will be described in greater detail forthcoming.

To better illustrate the operations of dynamic media router 150, reference is now made to an illustrative example where dynamic media router 150 initializes a conference between six participants identified in a client-server model (see FIG. 3A). Here, three of the six participants are in offices while clients 2-4 are in a lab. Dynamic media router 150 further determines a quality of service of network connections corresponding to the six participants, for example packet loss, bit rate, and throughput. Here, the quality of service metrics indicate that all participants have high quality wireless network connections with the exception of the lab participants corresponding to clients 3 and 4, which are wireless connections of low quality.

Dynamic media router 150 may generate a network mapping (step 204). In embodiments, dynamic media router 150 may generate a network mapping that details the information extracted during initialization, such as the device identifying information (e.g., username, IP address, MAC address, etc.), network configuration of the existing network connections (client-server, p2p, hybrid), and the quality of service thereof. The network mapping may further detail any alternative network connections between the participant client devices of the virtual conference. The alternative network connections may include any means for transmitting media between participants, and may include wired or wireless connections such as a LAN connection, Bluetooth, NFC, etc. For example, alternative network connections to a client-server network configuration may be one or more peer-to-peer network connections (see FIG. 3C-D) while alternative network connections to a peer-to-peer network configuration may be one or more client-server network connections (see FIG. 3A-B). Dynamic media router 150 may identify the alternative network connections based on exploring connection channels other than those used for the existing network connections. For example, dynamic media router 150 may identify an alternative communication channel between IP addresses or MAC addresses associated with two or more participant client devices. In embodiments, the alternative network connections may include two or more peer-to-peer network connections, for example transmitting media through multiple participant client devices before reaching an intended participant (see clients 2-4 of FIG. 3C-D). Whether in a client-server configuration, peer-to-peer configuration, or hybrid thereof, dynamic media router 150 may identify all initial and alternative network connections to generate a network mapping based thereon.

In the formerly introduced example, dynamic media router 150 generates a network mapping that details the six participants in a client-server network configuration as illustrated by FIG. 3A. The mapping further includes the quality of service of the network connections between the six participants and the hosting server, such as packet loss, bit rate, and throughput. Lastly, the network mapping details alternative network connections between participants, including a LAN connection between clients 2-4 within the lab.

Dynamic media router 150 may transmit media stream samples between the clients identified within the network mapping (step 206). While the quality of service metrics may be utilized for assessing the network connection quality of existing connections, dynamic media router 150 may determine a quality of the alternative network connections based on transmission loss of a media stream sample transmitted via the alternative network connections. To that end, dynamic media router 150 may instruct each client within the network mapping to transmit a media stream sample to each other client device via the identified alternative network connections. In some embodiments, because the media stream samples may be capable of bearing out metrics beyond what the quality of service is capable of, such as bandwidth and latency, dynamic media router 150 may optionally be configured to additionally transmit media stream samples via the existing network connections, as well. The transmission of the media stream sample may be transmitted between client devices via, for example, hardwired or wireless connection to a wide area network, a local area network, Bluetooth, NFC, etc. The media stream sample may be, for example, an audio or video clip of several hundred milliseconds or seconds (e.g., 3 seconds), and thus provide more data to analyse than a ping used by quality of service.

Along with the media stream sample, dynamic media router 150 clients may additionally transmit a checksum value corresponding to the media stream sample. More specifically, dynamic media router 150 or clients thereof may, prior to transmission of the media stream sample, determine a checksum value of the media stream sample indicative of a number of bits the media stream sample comprises. For example, a client may create or receive from the hosting server a media stream sample, then determine a number of bits within the sample. In embodiments, the transmitted checksum value is the baseline as it is determined locally and prior to subsequent transmission over a network connection that may be subject to data loss. Dynamic media router 150 clients receiving the media stream samples and checksum values may then themselves determine a checksum value of the received media stream sample for subsequent comparison the received checksum value. The comparison of the received to determined checksum values is reflective of an integrity of the media stream sample, and ultimately the network connection, as will be described in greater detail forthcoming.

Furthering the illustrative example introduced above, dynamic media router 150 transmits between the participants a three-second media stream sample along with a corresponding checksum value via the alternative network connections, here LAN and Bluetooth. In embodiments, dynamic media router 150 may additionally transmit the three-second media stream sample and corresponding checksum value to participant clients via the existing client-server network connections for additional network connection metrics, in this case the wireless WAN connections via client-server.

Dynamic media router 150 may determine network connection quality (step 208). In embodiments, dynamic media router 150 may determine a quality of the network connections based on an integrity of the received media stream samples, wherein the integrity denotes a difference between the media stream sample transmitted from one client and that received at another. More specifically, dynamic media router 150 clients may determine a checksum value of the received media stream sample, then compare the determined checksum value to that received along with the media stream sample from the originating client. Dynamic media router 150 may determine a quality of the network connection based on the determined integrity of the received media stream sample, for example integrity of the media stream sample may be proportional to corresponding network connection quality. From the comparison of the checksum values, dynamic media router 150 may determine network quality metrics such as latency, bandwidth, packet loss, bit rate, throughput, transmission delay, availability, jitter, etc. Using the above approach, dynamic media router 150 may determine a quality of the alternative (and optionally the existing network connections in addition to the already extracted quality of service metrics) amongst virtual conference participants, and do so at periodic intervals.

Furthering the illustrative example introduced above, dynamic media router 150 determines a checksum value of the received media stream samples and compares them to the received checksum values. Based on an integrity of the media stream samples, dynamic media router 150 determines a quality of the corresponding network connections to identify the wired LAN connection between clients 2-4 as being of high quality.

Dynamic media router 150 may determine whether a higher quality network connection is available (decision 210). More specifically, dynamic media router 150 may determine whether a higher quality network connection is available based on a comparison of qualities associated with the existing network connections and the one or more alternative network connections. In embodiments, the determination to switch network connections for media transmission may be multi-fold. For example, in order to switch client 3 from a client-server model in FIG. 3A to a peer-to-peer model in FIG. 3C, dynamic media router 150 must determine that client 2 has a higher quality connection to both client 3 and the server. Expanding further, to switch both of clients 3 and 4 from client-server in FIG. 3A to peer-to-peer in FIG. 3C, dynamic media router 150 must determine that client 2 has a higher quality connection to the server and client 3, as well as that client 3 has a higher quality network connection to client 4.

The decision to switch network connections for media transfer may further include a determination as to whether clients within the peer-to-peer network can handle the increased network bandwidth in satisfying the network demands one or more peers. For example, dynamic media router 150 may compare a network supply at a server-connected client (e.g., client 2 of FIG. 3C) to a cumulative demand of the clients connected in peer-to-peer (e.g., clients 3 and 4 of FIG. 3C). It may also be noted that network usage by a participant may vary (e.g., based on media transmission), network speeds can fluctuate locally, wireless signals can fluctuate based on participant location or movement, etc. In such a case that the a participant need switch from peer-to-peer to a client-server model, dynamic media router 150 need only determine whether the first participant has a high quality network connection with the server, as well as how rerouting may affect other participants connected peer-to-peer. In some embodiments, and particularly those having a web of multiple alternative network connection options, dynamic media router 150 may employ a model that ranks and stores different network configurations for future, similar virtual conference circumstances. As will be described forthcoming, the model may assist in circumstances such as recurring meetings where optimizing the routing of media may be expedited.

In embodiments where media stream samples are transmitted only to alternative network connections, the quality comparison may be made between the extracted quality of service metrics corresponding to the existing network connections and the network connection quality of the alternative network connections (derived from the media stream samples). The comparison may be based on common metrics between the determined quality of service and the determined network connection quality, for example based on packet loss, bit rate, throughput, transmission delay, availability, jitter, etc. In embodiments where media stream samples are additionally transmitted to existing network connections (in addition to extracting quality of service metrics thereof), the quality comparison to the alternative network connections may further include the network connection quality metrics of the existing networks (derived from the media stream samples), such as latency or bandwidth.

If dynamic media router 150 determines that a higher quality network connection is not available (decision 210, "NO" branch), then dynamic media router 150 may maintain media transmission through existing network connections and continue to assess network connection quality in a manner similar to that described above (steps 206-210). The frequency at which dynamic media router 150 continues assess network connection quality may be preconfigured or dynamically determined. For example, dynamic media router 150 may retransmit media streams on a reoccurring basis of once every ten minutes. In other embodiments, the frequency may be dynamic and based on factors such as network connection quality. For example, if the quality of an existing network connection is sufficiently similar to the quality of an alternative network connection, for example within a threshold range of each other, then a frequency at which a quality of the network connection is assessed may be increased to account for fluctuations that may change the quality rankings. In embodiments, dynamic media router 150 may also continue to determine quality of service of the client-server network connections at a similar frequency.

Accordingly, in the formerly introduced example, if dynamic media router 150 determines that the existing network connections between conference participants are of higher quality than the alternative network connections, then dynamic media router 150 maintains transmission of media via existing network connections within the client-server network configuration (see FIG. 3A). Dynamic media router 150 may also continue to determine a quality of the network connections at a preconfigured frequency of once every five minutes.

Alternatively, if dynamic media router 150 determines that a higher quality network connection is available (decision 210, "YES" branch), then dynamic media router 150 may route transmission of conference media via the alternative network connection (step 212). In embodiments, dynamic media router 150 may reroute the network traffic by replacing any the low quality network connections with one or more determined to have a higher quality. Dynamic media router 150 may identify available network connections based on reference to the network mapping, which may include a chain of any number of peer-to-peer connections, and further identify those having higher quality based on the determined network connection quality. After switching the network connection, dynamic media router 150 may ensure the network connection quality has increased by returning to the process of assessing network connection quality in relation to alternative network connections. In embodiments, dynamic media router 150 may provide an option or warning to participants prior switching the network connections such that action is not taken without user consent. The participant profile may store preferred settings in which a participant may configure when to switch media stream transmission.

Figure 3E:
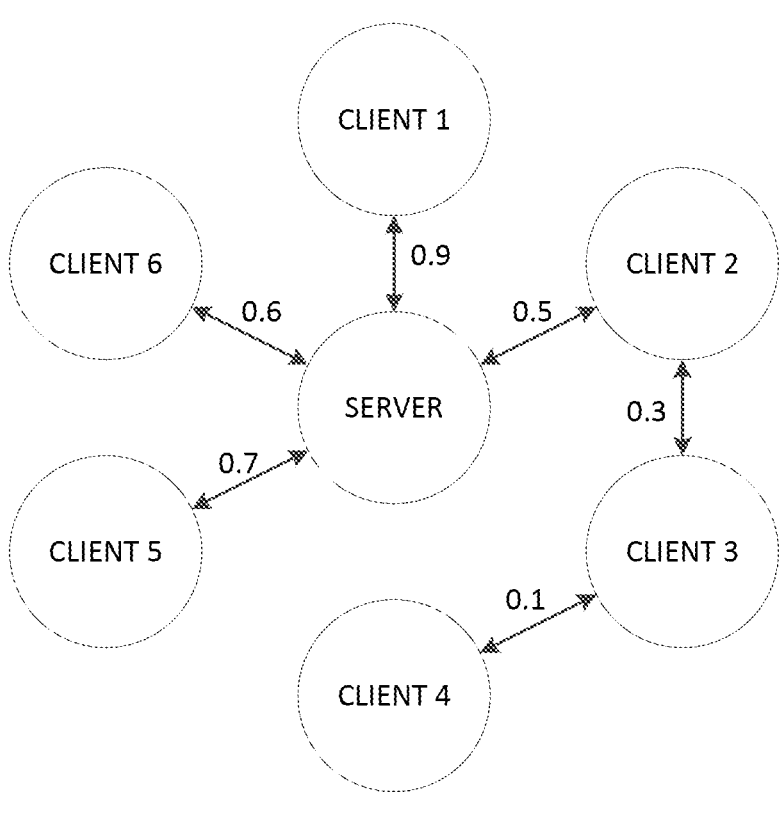
FIG. 3E depicts an exemplary weighted network mapping, in accordance with the exemplary embodiments.

Moreover, dynamic media router 150 may further store network connection information in association with the participant profiles such that known lower performing network connections may be initially avoided in favour of higher performing network connections. In such embodiments, dynamic media router 150 may associate particular data features with a quality of an associated network connection. For example, dynamic media router 150 may associate a MAC address of a lab PC with a typically lesser quality Wi-Fi connection, or locations outside of known buildings with low quality cellular network connections. Dynamic media router 150 may further train a model that identifies and weights the input features that have a largest impact on network connection quality (see FIG. 3E depicting weighted network connections). The model may be trained to associate input features such as username, IP address, MAC address, physical location, etc., with outputs indicative of network connection quality. In embodiments, dynamic media router 150 may then apply the model to input features identified at the initialization of a conference to determine whether an alternative network connection mapping is optimal without the need for the full analysis described here. In embodiments adopting a stored network configuration at initialization, dynamic media router 150 may nonetheless determine quality of service of the adopted network connections to ensure sufficient quality, or at least quality similar to that the model has stored. If an adopted network connection model isn't performing sufficiently, however, dynamic media router 150 may ultimately perform the entirety of the analysis described herein.

Concluding the aforementioned example with reference to FIGS. 3A-E, and based on determining that the wired LAN connection between lab participants on clients 2-4 is of higher quality than the wireless client-server connections of clients 3 and 4, and that client 2 can sustain the additional network demands of clients 3 and 4, dynamic media router

150 switches media transfer for clients 2-4 from client-server to peer-to-peer through client 2 and the LAN.

FIG. 3A depicts an exemplary client-server network configuration, in accordance with the exemplary embodiments. As depicted by FIG. 3A, all participant client devices connect to other participant client devices via a server.

FIG. 3B depicts an exemplary network connection of a client within a client-server network configuration, in accordance with the exemplary embodiments. As depicted by FIG. 3B, network traffic for a given participant client device travels through the server before being transmitted to other participant client devices.

FIG. 3C depicts an exemplary client-server and peer-to-peer hybrid network configuration, in accordance with the exemplary embodiments. As depicted by FIG. 3C, four participant client devices are configured as client-server while two are configured as peer-to-peer, and therefore a hybrid of client-server and peer-to-peer.

FIG. 3D depicts an exemplary network connection of a client within a client-server and peer-to-peer hybrid network configuration, in accordance with the exemplary embodiments. As depicted by FIG. 3D, network traffic for a given client within a client-server and peer-to-peer hybrid configuration travels through the server and at least one peer client prior to transmission to an intended client.

FIG. 3E depicts an exemplary weighted network mapping, in accordance with the exemplary embodiments.

What is claimed is:

1. A method for dynamic media routing within a virtual conference, the method comprising:
    determining a quality of one or more existing network connections corresponding to one or more participants of a virtual conference;
    transmitting a media stream sample and a corresponding checksum value between the one or more members of the virtual conference using one or more alternative network connections;
    determining a quality of the one or more alternative network connections based on the media stream sample and the corresponding checksum value; and
    based on determining that the quality of the one or more alternative network connections is higher than the quality of the one or more existing network connections, switching the one or more existing network connections to the one or more alternative network connections.

2. The method of claim 1, further comprising:
    generating a network mapping of the one or more participants detailing the quality of the one or more existing network connections and the quality of the one or more alternative network connections.

3. The method of claim 1, wherein the determining the quality of the one or more alternative network connections based on the media stream sample and the corresponding checksum value further comprises:
    determining a checksum value of the received media stream sample; and
    comparing the transmitted checksum value to the determined checksum value.

4. The method of claim 1, wherein the one or more existing network connections are configured in a client-server model and the one or more alternative network connections are configured in a peer-to-peer model, and wherein the one or more participants are connected via a hybrid of the client-server model and the peer-to-peer model.

5. The method of claim 4, wherein a peer-to-peer network connection of the peer-to-peer model includes two or more peer-to-peer network connections.

6. The method of claim 1, further comprising:
    extracting one or more input features from the one or more participants;
    training a model based on the one or more input features, the quality of the one or more existing network connections, and the quality of the one or more alternative network connections; and
    wherein the switching the one or more existing network connections to the one or more alternative network connections is based on applying the model to one or more new input features.

7. The method of claim 1, wherein the one or more existing network connections are configured in a peer-to-peer model and the one or more alternative network connections are configured in a client-server model.

8. A computer program product for dynamic media routing within a virtual conference, the computer program product comprising:
    one or more non-transitory computer-readable storage media and program instructions stored on the one or more non-transitory computer-readable storage media capable of performing a method, the method comprising:
    determining a quality of one or more existing network connections corresponding to one or more participants of a virtual conference;
    transmitting a media stream sample and a corresponding checksum value between the one or more members of the virtual conference using one or more alternative network connections;
    determining a quality of the one or more alternative network connections based on the media stream sample and the corresponding checksum value; and
    based on determining that the quality of the one or more alternative network connections is higher than the quality of the one or more existing network connections, switching the one or more existing network connections to the one or more alternative network connections.

9. The computer program product of claim 8, further comprising:
    generating a network mapping of the one or more participants detailing the quality of the one or more existing network connections and the quality of the one or more alternative network connections.

10. The computer program product of claim 8, wherein the determining the quality of the one or more alternative network connections based on the media stream sample and the corresponding checksum value further comprises:
    determining a checksum value of the received media stream sample; and
    comparing the transmitted checksum value to the determined checksum value.

11. The computer program product of claim 8, wherein the one or more existing network connections are configured in a client-server model and the one or more alternative network connections are configured in a peer-to-peer model, and wherein the one or more participants are connected via a hybrid of the client-server model and the peer-to-peer model.

12. The computer program product of claim 11, wherein a peer-to-peer network connection of the peer-to-peer model includes two or more peer-to-peer network connections.

13. The computer program product of claim 8, further comprising:

extracting one or more input features from the one or more participants;

training a model based on the one or more input features, the quality of the one or more existing network connections, and the quality of the one or more alternative network connections; and wherein the switching the one or more existing network connections to the one or more alternative network connections is based on applying the model to one or more new input features.

14. The computer program product of claim 8, wherein the one or more existing network connections are configured in a peer-to-peer model and the one or more alternative network connections are configured in a client-server model.

15. A computer system for dynamic media routing within a virtual conference, the system comprising:

one or more computer processors, one or more computer-readable storage media, and program instructions stored on the one or more of the computer-readable storage media for execution by at least one of the one or more processors capable of performing a method, the method comprising:

determining a quality of one or more existing network connections corresponding to one or more participants of a virtual conference;

transmitting a media stream sample and a corresponding checksum value between the one or more members of the virtual conference using one or more alternative network connections;

determining a quality of the one or more alternative network connections based on the media stream sample and the corresponding checksum value; and based on determining that the quality of the one or more alternative network connections is higher than the quality of the one or more existing network connections, switching the one or more existing network connections to the one or more alternative network connections.

16. The computer system of claim 15, further comprising:

generating a network mapping of the one or more participants detailing the quality of the one or more existing network connections and the quality of the one or more alternative network connections.

17. The computer system of claim 15, wherein the determining the quality of the one or more alternative network connections based on the media stream sample and the corresponding checksum value further comprises:

determining a checksum value of the received media stream sample; and comparing the transmitted checksum value to the determined checksum value.

18. The computer system of claim 15, wherein the one or more existing network connections are configured in a client-server model and the one or more alternative network connections are configured in a peer-to-peer model, and wherein the one or more participants are connected via a hybrid of the client-server model and the peer-to-peer model.

19. The computer system of claim 18, wherein a peer-to-peer network connection of the peer-to-peer model includes two or more peer-to-peer network connections.

20. The computer system of claim 15, further comprising:

extracting one or more input features from the one or more participants;

training a model based on the one or more input features, the quality of the one or more existing network connections, and the quality of the one or more alternative network connections; and wherein the switching the one or more existing network connections to the one or more alternative network connections is based on applying the model to one or more new input features.

\*   \*   \*   \*   \*